US012625743B2

(12) United States Patent (10) Patent No.: US 12,625,743 B2
Sethi et al. (45) Date of Patent: May 12, 2026

(54) PERFORMING PRE-MIGRATION AND POST-MIGRATION CONNECTION CHECKS

(71) Applicant: Dell Products L.P., Round Rock, TX (US)

(72) Inventors: Parminder Singh Sethi, Ludhiana (IN); Lakshmi Saroja Nalam, Bangalore (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 534 days.

(21) Appl. No.: 17/994,685

(22) Filed: Nov. 28, 2022

(65) Prior Publication Data

US 2024/0176676 A1     May 30, 2024

(51) Int. Cl.
*G06F 9/50* (2006.01)
(52) U.S. Cl.
CPC .................................. *G06F 9/5088* (2013.01)
(58) Field of Classification Search
CPC .................................................... G06F 9/5088
See application file for complete search history.

(56) References Cited

U.S. PATENT DOCUMENTS

| | | | |
|---|---|---|---|
| 6,105,035 A | 8/2000 | Monge | |
| 6,195,760 B1 | 2/2001 | Chung et al. | |
| 6,393,480 B1 | 5/2002 | Qin | |
| 6,563,836 B1 | 5/2003 | Capps | |
| 7,251,745 B2 | 7/2007 | Koch et al. | |
| 7,401,248 B2 | 7/2008 | Nakahara et al. | |
| 7,525,749 B2 | 4/2009 | Maejima et al. | |
| 7,590,981 B2 | 9/2009 | Gupta et al. | |
| 7,966,391 B2 | 6/2011 | Anderson et al. | |
| 8,078,448 B1 | 12/2011 | Wohlberg et al. | |

(Continued)

FOREIGN PATENT DOCUMENTS

| | | |
|---|---|---|
| CN | 106649091 A | 5/2017 |
| WO | 2021122516 A1 | 6/2021 |
| WO | 2022104396 A1 | 5/2022 |

OTHER PUBLICATIONS

Wu, Suzhen et al., Proactive Data Migration for Improved Storage Availability in Large-Scale Dat Centers, Sep. 2015, IEEE (15 pages).

(Continued)

*Primary Examiner* — Sisley N Kim
(74) *Attorney, Agent, or Firm* — Chamberlain, Hrdlicka, White, Williams & Aughtry; Aly Z. Dossa

(57) ABSTRACT

Embodiments described herein relate to methods, systems, and non-transitory computer readable mediums storing instructions for creating and executing migration workflows to replicate or migrate data from one device or set of devices to another device or set of devices. The embodiments perform checks both before a migration and after the migration is completed to determine if the migrated application and those applications and devices related to it are sufficiently connected and are functioning. Each application or device associated with one or more applications that have been migrated are message in order to determine that all related applications and/or components such as storage devices are communicating in a sufficient manner to provide a desired level of performance to a user of the one or more applications.

17 Claims, 7 Drawing Sheets

(56)                 References Cited

U.S. PATENT DOCUMENTS

| | | |
|---|---|---|
| 8,364,799 B2 | 1/2013 | Sakai |
| 8,918,673 B1 | 12/2014 | Rangaiah et al. |
| 9,015,832 B1 | 4/2015 | Lachwani et al. |
| 9,026,260 B1 | 5/2015 | Thornley et al. |
| 9,086,941 B1 | 7/2015 | Siegel |
| 9,397,930 B2 | 7/2016 | Drobinsky et al. |
| 9,417,918 B2 | 8/2016 | Chin |
| 9,514,164 B1 | 12/2016 | Matic |
| 9,515,873 B2 | 12/2016 | Anumala |
| 9,900,215 B2 | 2/2018 | Yang et al. |
| 10,303,465 B1 | 5/2019 | Potter |
| 10,572,294 B1 | 2/2020 | Chawda et al. |
| 10,785,123 B2 | 9/2020 | Gonguet |
| 11,392,402 B1 | 7/2022 | Carroll |
| 11,424,989 B2 | 8/2022 | Jeuk et al. |
| 11,588,893 B1 | 2/2023 | Sharma |
| 11,595,269 B1 | 2/2023 | Ghosh et al. |
| 11,846,918 B1 | 12/2023 | Mazur |
| 2002/0095474 A1 | 7/2002 | Boys |
| 2002/0138226 A1 | 9/2002 | Doane |
| 2003/0233230 A1 | 12/2003 | Ammicht |
| 2003/0236819 A1 | 12/2003 | Greubel |
| 2005/0216800 A1 | 9/2005 | Bicknell et al. |
| 2005/0257090 A1 | 11/2005 | Santos |
| 2006/0031842 A1 | 2/2006 | Neiman |
| 2006/0129771 A1 | 6/2006 | Dasgupta et al. |
| 2007/0079170 A1 | 4/2007 | Zimmer et al. |
| 2007/0198524 A1 | 8/2007 | Branda et al. |
| 2007/0198968 A1 | 8/2007 | Shenfield |
| 2008/0222218 A1 | 9/2008 | Richards et al. |
| 2009/0157882 A1 | 6/2009 | Kashyap |
| 2009/0265449 A1 | 10/2009 | Krishnappa et al. |
| 2009/0307522 A1 | 12/2009 | Olson et al. |
| 2011/0087672 A1 | 4/2011 | Hui |
| 2011/0113224 A1 | 5/2011 | Isshiki et al. |
| 2011/0251998 A1 | 10/2011 | Moore |
| 2011/0307903 A1 | 12/2011 | Vaddagiri |
| 2012/0054581 A1 | 3/2012 | Grube |
| 2012/0072571 A1 | 3/2012 | Orzell et al. |
| 2012/0089711 A1 | 4/2012 | Zager |
| 2012/0151061 A1 | 6/2012 | Bartfai-walcott |
| 2012/0254849 A1 | 10/2012 | Wang |
| 2013/0103977 A1 | 4/2013 | Zimmermann |
| 2013/0346714 A1 | 12/2013 | Solihin |
| 2014/0172782 A1 | 6/2014 | Schuenzel |
| 2014/0376385 A1 | 12/2014 | Boss et al. |
| 2015/0169329 A1 | 6/2015 | Barrat |
| 2015/0222702 A1 | 8/2015 | Salle |
| 2015/0261518 A1 | 9/2015 | Viswanathan |
| 2015/0278219 A1 | 10/2015 | Phipps |
| 2015/0347573 A1 | 12/2015 | Hosokawa |
| 2016/0162280 A1 | 6/2016 | Murayama et al. |
| 2016/0239395 A1 | 8/2016 | Madsen et al. |
| 2016/0266875 A1 | 9/2016 | Takahashi |
| 2016/0359678 A1 | 12/2016 | Madani |
| 2016/0378525 A1 | 12/2016 | Bjorkengren |
| 2016/0378648 A1 | 12/2016 | Ekambaram |
| 2017/0046202 A1 | 2/2017 | Bao |
| 2017/0337088 A1 | 11/2017 | Wang |
| 2017/0359414 A1 | 12/2017 | Sengupta et al. |
| 2018/0046489 A1 | 2/2018 | Onoue |
| 2018/0074855 A1 | 3/2018 | Kambatla |
| 2018/0113728 A1 | 4/2018 | Musani et al. |
| 2018/0124182 A1 | 5/2018 | Orman |

| | | | |
|---|---|---|---|
| 2018/0152341 A1 | 5/2018 | Maeda et al. | |
| 2018/0157723 A1 | 6/2018 | Chougule | |
| 2018/0196655 A1 | 7/2018 | Kapoor et al. | |
| 2018/0262979 A1 | 9/2018 | Wang et al. | |
| 2018/0322276 A1 | 11/2018 | Brown | |
| 2019/0087224 A1 | 3/2019 | Vrind | |
| 2019/0104019 A1 | 4/2019 | Makovsky | |
| 2019/0199687 A1 | 6/2019 | Lan | |
| 2019/0310872 A1 | 10/2019 | Griffin | |
| 2019/0311041 A1 | 10/2019 | Shah | |
| 2019/0379595 A1 | 12/2019 | Ur et al. | |
| 2020/0028904 A1* | 1/2020 | Delbecq | H04L 41/145 |
| 2020/0099773 A1 | 3/2020 | Myers | |
| 2020/0100323 A1 | 3/2020 | Zhou et al. | |
| 2020/0104113 A1 | 4/2020 | Grill et al. | |
| 2020/0110655 A1 | 4/2020 | Harwood et al. | |
| 2020/0133772 A1 | 4/2020 | Dalmatov et al. | |
| 2020/0156243 A1 | 5/2020 | Ghare et al. | |
| 2020/0169921 A1 | 5/2020 | Zhu | |
| 2020/0264919 A1* | 8/2020 | Vukovic | G06N 20/00 |
| 2020/0264930 A1 | 8/2020 | Mandagere et al. | |
| 2020/0344658 A1 | 10/2020 | Huang | |
| 2020/0349238 A1 | 11/2020 | Tyagi | |
| 2020/0366604 A1 | 11/2020 | Banerjee et al. | |
| 2021/0064401 A1 | 3/2021 | Vichare | |
| 2021/0084103 A1* | 3/2021 | Smith | G06F 16/285 |
| 2021/0153044 A1 | 5/2021 | Ramanathan et al. | |
| 2021/0165768 A1 | 6/2021 | D'halluin et al. | |
| 2021/0200814 A1 | 7/2021 | Tal | |
| 2021/0373947 A1 | 12/2021 | Kweon | |
| 2022/0070648 A1 | 3/2022 | Krishan | |
| 2022/0075613 A1 | 3/2022 | Ramachandran | |
| 2022/0091980 A1 | 3/2022 | Kayiran | |
| 2022/0138081 A1 | 5/2022 | Varma et al. | |
| 2022/0158926 A1 | 5/2022 | Wennerström et al. | |
| 2022/0164186 A1 | 5/2022 | Pamidala | |
| 2022/0167363 A1 | 5/2022 | Sun | |
| 2022/0171856 A1 | 6/2022 | Bhatt | |
| 2022/0179683 A1 | 6/2022 | Verma et al. | |
| 2022/0206842 A1 | 6/2022 | Sahita et al. | |
| 2022/0229573 A1 | 7/2022 | Ramasamy | |
| 2022/0240105 A1 | 7/2022 | Shaw | |
| 2022/0272142 A1 | 8/2022 | Li et al. | |
| 2022/0283784 A1 | 9/2022 | Degen et al. | |
| 2022/0334870 A1 | 10/2022 | Chen | |
| 2022/0337493 A1 | 10/2022 | Sant et al. | |
| 2022/0337501 A1 | 10/2022 | Sant et al. | |
| 2022/0342697 A1 | 10/2022 | Macfarlane | |
| 2022/0368602 A1 | 11/2022 | Adhav et al. | |
| 2022/0413845 A1 | 12/2022 | Mathew | |
| 2023/0033886 A1 | 2/2023 | Goswami et al. | |
| 2023/0037124 A1 | 2/2023 | Mengwasser et al. | |
| 2023/0080047 A1 | 3/2023 | Bashir | |
| 2023/0098941 A1 | 3/2023 | Rizzi et al. | |
| 2024/0037011 A1 | 2/2024 | Zheng | |
| 2025/0036469 A1* | 1/2025 | Deng | G06F 9/5027 |

OTHER PUBLICATIONS

Steven D. Young, "In-Time Safety Assurance Systems for Emerging Autonomous Flight Operations", pp. 1-10, https://ieeexplore.ieee.org/stamp/stamp.jsp?tp=&arnumber-8569689 (Year: 2018) (10 pages).
Mona Elsaadawy et al., Enabling efficient application monitoring in cloud data centers using SDN, 1902.11292, pp. 1-14, Year: 2019 (14 pages).

* cited by examiner

600

PERFORMING PRE-MIGRATION AND POST-MIGRATION CONNECTION CHECKS

BACKGROUND

Computing devices often exist in environments that include many devices (e.g., servers, virtualization environments, storage devices, network devices, etc.). Such environments may, from time to time, in whole or in part, require being replicated (e.g., backed-up) and/or migrated (e.g., moved from one set of devices to another). Such replications and/or migrations often require copious amounts of investigation, coordination, time, and manual steps to be performed by any number of system administrators. When a migration is performed, the application must be taken offline, this may affect other applications that are dependent on it to function or obtain data.

SUMMARY

In general, embodiments described herein relate to a method for performing a migration. The method begins by identifying an application to be migrated and identifying at least one application that is related to the application to be migrated. The method then performs a pre-migration check of the application to be migrated and the at least one application that is related to the application to be migrated. The application that is to be migrated is then migrated and a post-migration check of the application to be migrated and the at least one application that is related to the application to be migrated is performed. If the post-migration check fails, a user or administrator is alerted.

In general, embodiments described herein relate to a non-transitory computer readable medium comprising computer readable program code. The computer readable code, which when executed by a computer processor, enables the computer processor to perform a method for performing a migration. The method begins by identifying an application to be migrated and identifying at least one application that is related to the application to be migrated. The method then performs a pre-migration check of the application to be migrated and the at least one application that is related to the application to be migrated. The application that is to be migrated is then migrated and a post-migration check of the application to be migrated and the at least one application that is related to the application to be migrated is performed. If the post-migration check fails, a user or administrator is alerted.

In general, embodiments described herein relate to a migrator which comprises at least one processor, a storage device, and at least one memory. The memory includes instructions, which when executed by the processor perform a method for performing a migration. The method begins by identifying an application to be migrated and identifying at least one application that is related to the application to be migrated. The method then performs a pre-migration check of the application to be migrated and the at least one application that is related to the application to be migrated. The application that is to be migrated is then migrated. Then a post-migration check of the application to be migrated and the at least one application that is related to the application to be migrated is performed. If the post-migration check fails, a user or administrator is alerted.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
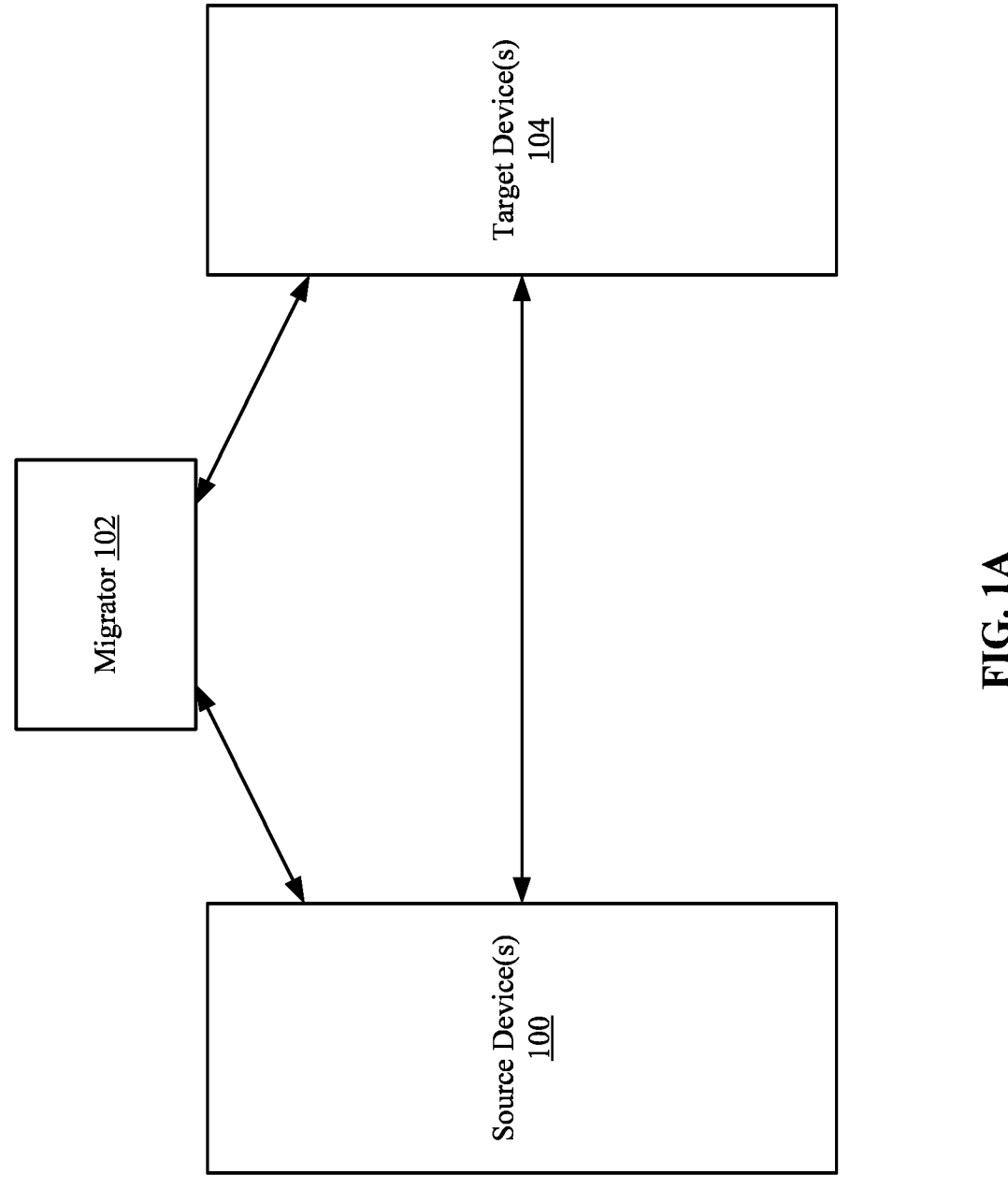
FIG. 1A shows a diagram of a system in accordance with one or more embodiments of the invention.

In the below description, numerous details are set forth as examples of embodiments described herein. It will be understood by those skilled in the art and having the benefit of this Detailed Description that one or more embodiments of the embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems, and non-transitory computer readable mediums storing instructions for creating and executing migration workflows to replicate or migrate data (collectively referred to herein as 'migration') from one device or set of devices to another device or set of devices (e.g., from one computing environment to another). In one or more embodiments, migrations involve obtaining relationship information with regards to applications that will be migrated from one device to another device or set of devices. In one or more embodiments of the invention, the migrations also perform additional checks both before a migration (pre-migration) and after the migration is completed (post-migration) to determine if the migrated application and those applications related to it are sufficiently connected and are functioning.

In one or more embodiments, the pre-migration and post-migration checks are performed by a checker which in one or more embodiments of the invention is part of a migrator. Alternatively, in one or more embodiments of the invention, the checker may be a separate component from the migrator. The checker messages each application or device associated with one or more applications that are being migrated, in order to determine that all related applications and/or components, such as storage devices, may communicate in a sufficient manner to provide a desired level of performance to a user of the one or more applications. If the desired level of performance (compared to pre-migration) is not achieved, then a user or administrator may be alerted to perform necessary interventions to restore the one or more applications or related components of any computing devices hosting the one or more applications, so that all migrated applications and related applications may be brought back online and provide a sufficient user experience.

While described as being performed on applications being migrated, one or more embodiments of the invention are not limited to applications, and may be related to any aspects of an information handling system comprising of one or more servers and other computing devices being migrated, that affects the functioning of other applications and/or aspects of one or more other components of the information handling system and/or other information handling systems. One non-limiting example may be migrating a storage volume such as those storing database data.

FIG. 1A shows a diagram of a system in accordance with one or more embodiments described herein. The system may include any number of source devices (100), and any number of target devices (104). The system may also include a migrator (102) operatively connected to the source devices (100) and to the target devices (104). Each of these components is described below.

In one or more embodiments, the source devices (100) and the target devices (104) may be computing devices. Such computing devices may be referred to as endpoints. In one or more embodiments, an endpoint is any computing device, collection of computing devices, portion of one or more computing devices, or any other logical grouping of computing resources. In one or more embodiments, the source devices (100) may collectively be referred to as a source environment.

Similarly, in one or more embodiments, target devices (104) may collectively be referred to as a target environment. In one or more embodiments, a computing device is any device, portion of a device, or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fiber channel storage device, an Internet Small Computer Systems Interface (iSCSI) storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing devices with the aforementioned requirements.

In one or more embodiments, any or all of the aforementioned examples may be combined to create a system of such devices, which may collectively be referred to as a computing device. Other types of computing devices may be used without departing from the scope of the invention. In one or more embodiments, a set of computing devices (100) may form all or a portion of a data domain, all, or part of which may require being migrated (e.g., re-located, backed-up, etc.) from time to time (e.g., upon request and/or pursuant to a defined schedule). In one or more embodiments, a data domain is any set of computing devices (100) for which migration services are performed, such as, for example, data backup, disaster recovery, backup data deduplication, relocation to updated/newer computing devices, etc.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, the system also includes a migrator (102). In one or more embodiments, the migrator (102) is operatively connected to both the source devices (100) and the target devices (104). A migrator (102), in accordance with one or more embodiments of the invention, functions to migrate applications from a source device (100) to a target device (104). A migrator (102) may be located within a source environment, within a target environment, or separate from and connected to both environments. In one or more embodiments, the migrator (102) is a computing device. In one or more embodiments, a computing device (100) is any device, portion of a device, or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., SSDs, HDDs (not shown)), one or more physical interfaces (e.g., network ports, storage ports) (not shown), any number of other hardware components (not shown) and/or any combination thereof.

The migrator (102) may perform one or more methods of the embodiments, as described herein that are stored, for example, as software instructions. The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium. The migrator (102), and components, therein are discussed further in the description of FIGS. 1B and 1C, below.

In one or more embodiments, the source devices (100), the migrator (102), and/or the target devices (104) are operatively connected via a network (not shown). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. A network may be located at a single physical location or be distributed at any number of physical sites. In one or more embodiments, a network may be coupled with or overlap, at least in part, with the Internet.

While FIG. 1A shows a configuration of components, other configurations may be used without departing from the scope of embodiments described herein. Accordingly, embodiments disclosed herein should not be limited to the configuration of components shown in FIG. 1A.

Figure 1B:
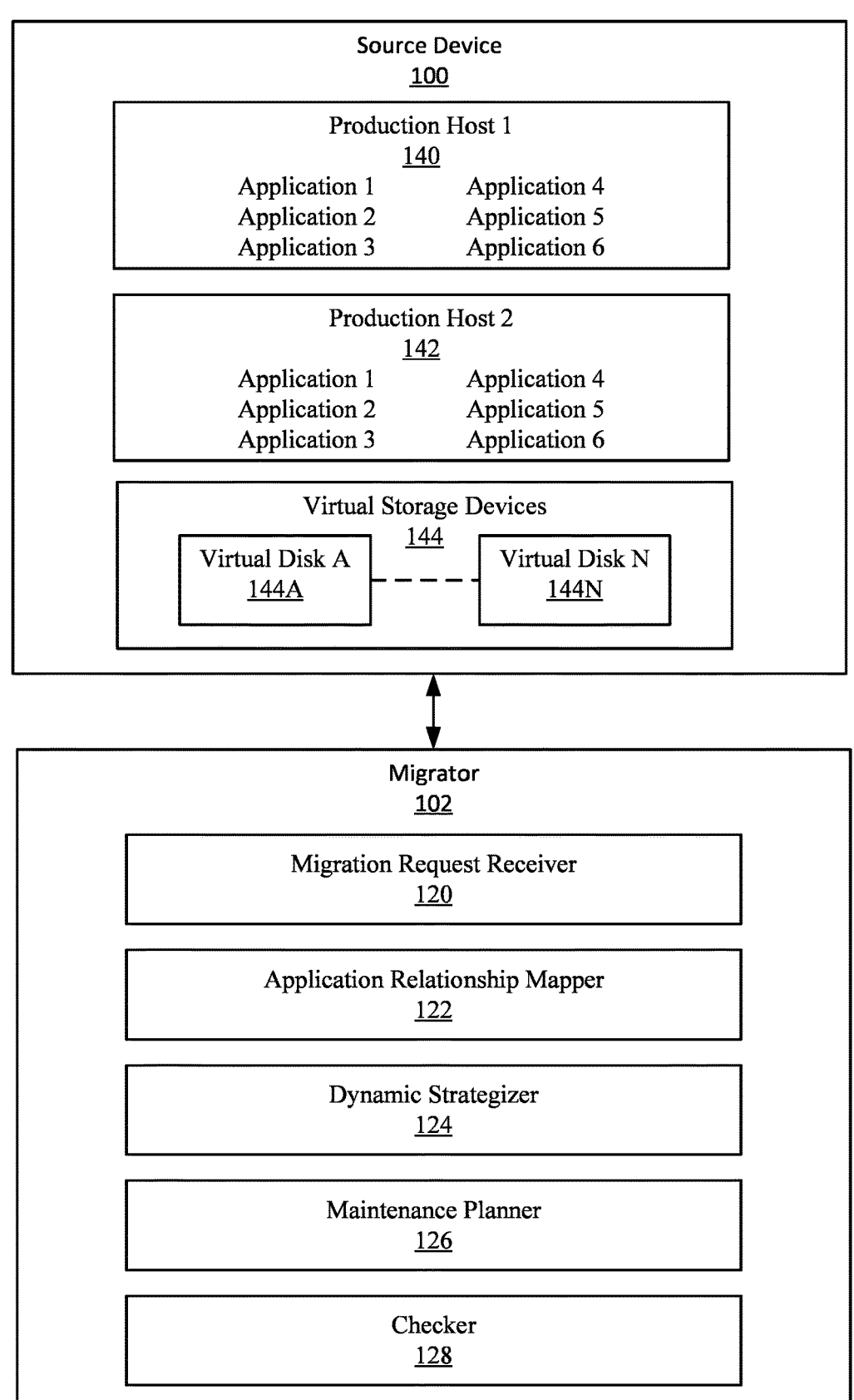
FIG. 1B shows a diagram of an information processing device in accordance with one or more embodiments of the invention.

FIG. 1B shows a diagram of a system that performs the claimed methods in one or more embodiments of the invention. The system includes source devices (100) and a migrator (102), in accordance with one or more embodiments described herein. For simplicity, the system shown in FIG. 1B only shows a subset of the system (e.g., the system shown in FIG. 1A).

As shown in FIG. 1B, the source device (100) includes one or more hosts (e.g., 140, 142) as well as a plurality of virtual storage devices (e.g., 144A, 144N). In one or more embodiments of the invention the target device (e.g., 104, FIG. 1A) has a similar form and structure to that of the source device (100). In one or more embodiments of the invention, the target device (e.g., 104, FIG. 1A) and source device (e.g., 100) may be part of the same physical device. In other embodiments, they may be separate devices that are connected either by a wired or wireless connection. One or more of the devices may also be an Internet or cloud based virtual device. Other configurations of the source device (100) and target device (104) may be used without departing from the invention.

In one or more embodiments of the invention, the production hosts (e.g., 140, 142), host one or more applications. In one or more embodiments of the invention, the application(s) perform computer implemented services for clients (not shown). Performing the computer implemented services may include performing operations on asset data that is stored in the virtual storage devices (e.g., 144). The operations may include creating elements of assets, moving elements of assets, modifying elements of assets, deleting elements of assets, and other and/or additional operations on asset data without departing from the invention. The application(s) may include functionality for performing the aforementioned operations on the asset data in the production hosts (e.g., 140, 142). The application(s) may be, for example, instances of databases, email servers, and/or other applications. The production hosts (e.g., 140, 142) may host other types of applications without departing from the invention, including hosting the application relationship mapper (122).

In one or more of embodiments of the invention, the applications are implemented as computer instructions, e.g., computer code, stored on a persistent storage or virtual storage devices (144), that when executed by a processor(s) of the production hosts (e.g., 140, 142) cause the production hosts (e.g., 140, 142) to provide the functionality of the application(s) described throughout this application.

The production hosts (e.g., 140, 142) may include physical storage or logical storage (144, as shown in FIG. 1B). One or more of the production hosts (e.g., 140, 142), may be externally located on a cloud or other external location. The logical storage devices (144) may utilize any quantity of hardware storage resources of any number of computing devices for storing data. For example, the persistent storage may utilize portions of any combination of hard disk drives, solid state disk drives, tape drives, and/or any other physical storage medium of any number of computing devices.

In one or more embodiments of the invention, the production hosts (e.g., 140, 142) may host virtual machines that host the above-discussed applications. Each of the production hosts (e.g., 140, 142) may host any number of VMs that, in turn, host any number of applications. Each of the production hosts (e.g., 140, 142) may host or be operatively connected to a plurality of virtual storage devices (e.g., 144A, 144N). Alternatively, in one or more embodiments of the invention the virtual storage devices (144) may instead be physical storage devices such as hard disk drive, solid disk drive, tape drives, and/or other physical storage mediums of any number of computing devices.

Figure 6:
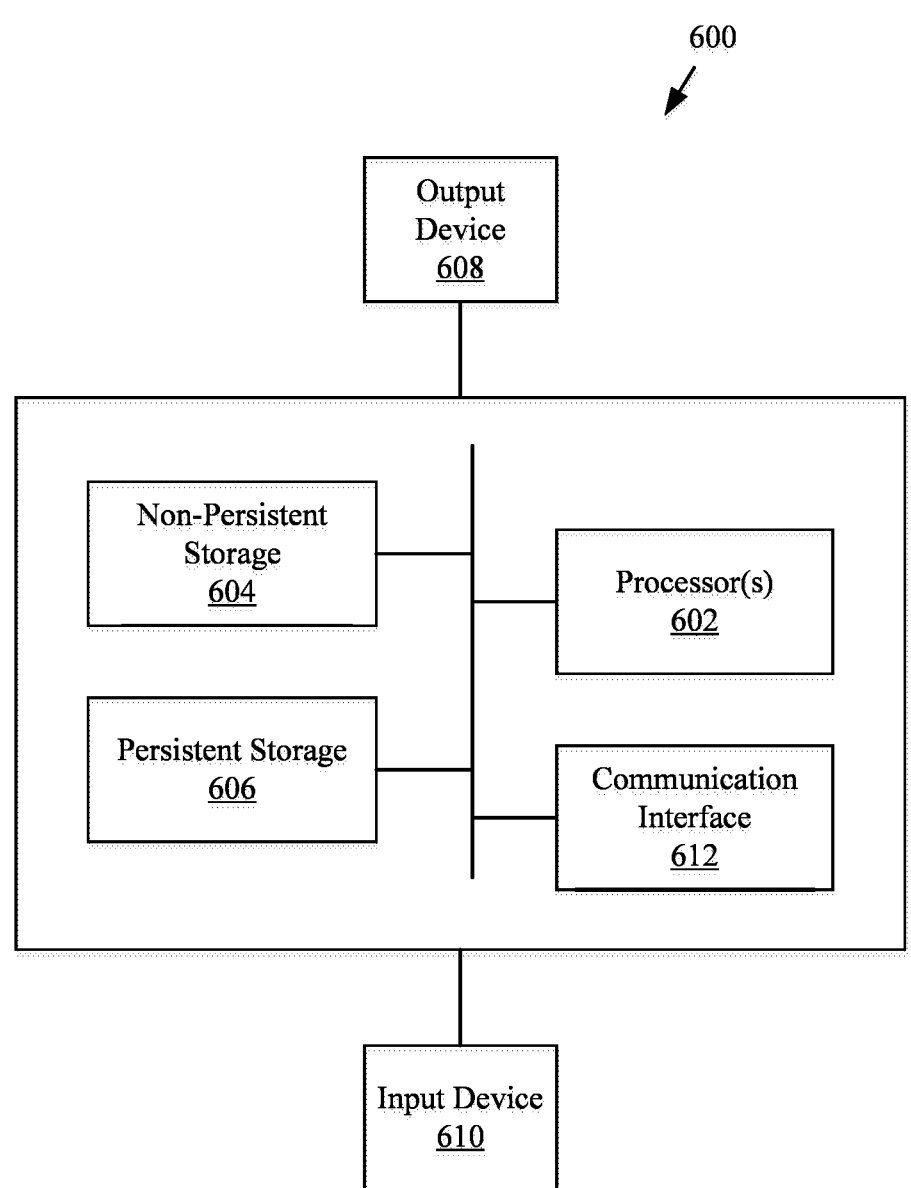
FIG. 6 shows a computing system in accordance with one or more embodiments of the invention.

In one or more embodiments of the invention, the production hosts (e.g., 140, 142) may be implemented as computing devices (e.g., 600, FIG. 6). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the production hosts (e.g., 140, 142) described throughout this application.

As shown in FIG. 1B, the migrator (102) includes a one or more components (e.g., 120, 122, 124, 126, and 128). The migrator (102) may include any number of components which may be more or less then what is shown in FIG. 1B. As shown in FIG. 1B, the migrator (102) includes a migration request receiver (120), an application relationship mapper (122), a dynamic strategizer (124), a maintenance planner (126), and a checker (128). Each of these components is described below. In one or more embodiments, a migrator (102) is a computing device, as discussed above in the description of FIG. 1A.

In one or more embodiments, the migrator (102) includes a migration request receiver (120). In one or more embodiments, a migration request receiver is any hardware (e.g., circuitry), software, firmware, or any combination thereof that includes functionality to receive a request that all or any portion of a source device (100) be migrated to a target environment (e.g., target devices (104) of FIG. 1A). In one or more embodiments, such a migration request may be received via a user interface (not shown), may be received on a recurring basis as part of a planned migration scheme, may be received as part of a planned computing environment upgrade, etc.

A migration request may be for any type of migration or combination of migration types. Examples of migration types include, but are not limited to: storage array to hyper-converged infrastructure (HCl), host server to host server, VM environment to HCl, storage array to storage array, hypervisors to hypervisors, host servers to storage array, on-premise computing devices to a cloud environment and vice versa, application servers to application servers (e.g., older Exchange server to either a newer on-premise Exchange server or to a cloud-based Exchange service), different source to target endpoints that may be from vendors that are unique and different, backup of all or part of a data center environment, etc. One of ordinary skill in the art, having the benefit of this detailed disclosure will appreciate that any other type of migration may be requested without departing from the scope of embodiments described herein.

Such endpoint information may include, but is not limited to: system types, license information, software versions, virtualization environment details, operating system information, virtual machine information, source and target device identification information, endpoint organization information (e.g., cluster membership), HCl details information, storage configuration information, storage array details (e.g., RAID level configuration information), disk information (e.g., disk type, disk layout, etc.), network configuration information, interface connection information, network speed information, network adapter information, network addresses, feature enablement information, endpoint system setting information (e.g., BIOS information), file system information, storage management initiative specification (SMIS) object information, protocol information, device type information, cache policy information, spare storage information, storage controller information, storage area network information, operating system information, file system information, application information and settings, process identifiers, common object model (COM) object information, etc. One having ordinary skill in the art will appreciate that any other type of information that could be associated with all or any portion of computing devices or with any portion thereof in a computing environment may be considered endpoint information without departing from the scope of embodiments described herein.

In one or more embodiments of the invention, the migration request receiver (120) receives a request to migrate an application from a production host (e.g., 140) to a target production host (not shown) that is located on a target device (e.g., 104, FIG. 1A). Once this request is received, the migrator (102) forwards it to an application relationship mapper (122) which will be described in more detail below.

In one or more embodiments of the invention, the migration request receiver (120) may be implemented as computing devices (e.g., 600, FIG. 6). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the migration request receiver (120) described throughout this application.

In one or more embodiments of the invention, the migrator (102) includes an application relationship mapper (122). The application relationship mapper (122) determines the relationship between individual applications that are to be migrated.

In one or more embodiments of the invention, the application relationship mapper (122) determines the relationships between the application(s) to be migrated and other applications. The application(s) to be migrated and the other applications that are related to it, are not necessarily located on the same production host (e.g., 140) or even the same source device (e.g., 100). The Application relationship mapper (122) analyzes traffic on both ports internal to the source device (e.g., 100) and individual production hosts (e.g., 140, 142) as well as traffic on the target device (e.g., 104, FIG. 1A) and other external devices that are connected by a local network and/or Internet, such as cloud and edge environments.

The relationship in one or more embodiments of the invention, may be determined by port mapping such as looking at port mapping meta-data or the actual system internal traffic on various ports. By analyzing whether traffic on a specific port is outgoing or incoming, the relationship mapper or other equivalent structure may determine whether the application is a parent (or parent node) or a child (or a child node). The independent application in a system would be a parent and the dependent application would be the child. The child or dependent application would be considered to have an IS-A relationship with the parent.

In one or more embodiments of the invention, the application relationship mapper finds multiple applications with the same system access to the same data paths and location.

In this case, the application relationship mapper determines that the two applications have a HAS-A relationship. This may be determined by the application relationship mapper by looking at meta-data for the particular data path and or a registration ID that is common to at least two applications. Other means for identifying both a HAS-A relationship and/or IS-A relationship may be used without departing from the invention.

In one or more embodiments of the invention, the application relationship mapper (122) may be implemented as computing devices (e.g., 600, FIG. 6). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the application relationship mapper (122) described throughout this application.

In one or more embodiments of the invention, the migrator (102) includes a dynamic strategizer (124). The dynamic strategizer (124) analyzes data on the applications, related applications, and/or devices to determine the best strategy for migrating each application. In accordance with one or more embodiments of the invention, the dynamic strategizer obtains log data on each of the applications that are to be migrated, as well as those applications that depend on the applications to be migrated. Using the log-data, the dynamic strategizer determines the idle times and/or reduced usage times, peak usage times, and loading time of each of the applications to be migrated and those applications that depend on the application being migrated. Based on these times, the dynamic strategizer (124) in concert with the maintenance planner (126), which will be described next, is able to plan the best times to perform the migration and place appropriate applications/devices in a maintenance mode as will be described in more detail with regards to the method shown in FIG. 2.

In one or more embodiments of the invention, the dynamic strategizer (124) may be implemented as computing devices (e.g., 600, FIG. 6). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the dynamic strategizer (124) described throughout this application.

In one or more embodiments of the invention, the maintenance planner (126) determines when to perform a migration and places applications being migrated and any related applications or systems that depend on the application in a maintenance mode prior to performing a migration. When performing a migration, the maintenance planner (126), in one or more embodiments of the invention, sends notices to users, or other concerned parties such as administrators, that the application being migrated as well as related applications and systems will be down. The maintenance planner (126) also communicates to the users or other concerned parties an estimate for how long the affected applications and systems will be off-line (in a maintenance mode) during the migration.

In one or more embodiments of the invention, the maintenance mode, among other things, takes the application offline, so that users may not continue to use or store data related to the application. This keeps the application and its data from becoming un-coordinated and/or corrupted. Once an application is migrated, the maintenance planner (126) sends a maintenance mode end signal, and the application, as well as related applications, are taken out of maintenance mode and becomes available for use by the user again.

In one or more embodiments of the invention, the maintenance planner (126) may be implemented as computing devices (e.g., 600, FIG. 6). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the maintenance planner (126) described throughout this application.

In one or more embodiments of the invention, the migrator (102) includes a checker (128). The checker (128) performs checks on the applications being migrated and those applications related to them as well as other systems necessary to the proper functioning of the applications being migrated and/or applications that utilize or depend on the applications being migrated.

The checker (128), as will be described in more detail with regards to the methods shown in FIGS. 2-4, sends messages before and after the migration to each application being migrated as well as any other related applications or devices as determined by the application relationship mapper (122). The messages sent prior to the migration determine normal response times of each application and/or device. Once the migration is complete, the checker again sends messages to the application(s) being migrated as well as any related applications and/or devices to determine if they are responsive. If determined responsive, the checker compares the response times to the response times determined by the messages sent by the checker prior to the migration.

The checker compares the response time prior to the migration and the response time after the migration to determine how much they differ. In one or more embodiments of the invention, if the difference is within a predetermined threshold such as but not limited to a percentage (for example, 5%, 10%, or any other preset percentage), then the checker may determine that the application and/or component post-migration are functioning appropriately. If all applications and/or components that are messaged by the checker pass the post-migration check (are functioning appropriately), then the checker may indicate that the migration has been successful, and the maintenance planner (126) may take them out of maintenance mode.

However, if the checker determines that one or more applications and/or components do not pass the post-migration check (a return message take longer than a threshold period of time or is not received at all), then the checker notifies a user, administrator and/or other appropriate entity (such as, but not limited to, an automated system for reversing a migration, a manufacturer, etc.), that the migration has been unsuccessful as well as any useful information as appropriate for correcting the problem. The application(s) being migrated as well as related applications and components are left in the maintenance mode.

In one or more embodiments of the invention, the checker (128) may be implemented as computing devices (e.g., 600, FIG. 6). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the checker (128) described throughout this application.

While FIG. 1B shows a configuration of components, other configurations may be used without departing from the scope of embodiments described herein. For example, although FIG. 1B shows all components as part of two devices, any of the components may be grouped in sets of one or more components which may exist and execute as part of any number of separate and operatively connected devices. Accordingly, embodiments disclosed herein should not be limited to the configuration of components shown in FIG. 1B.

Figure 2:
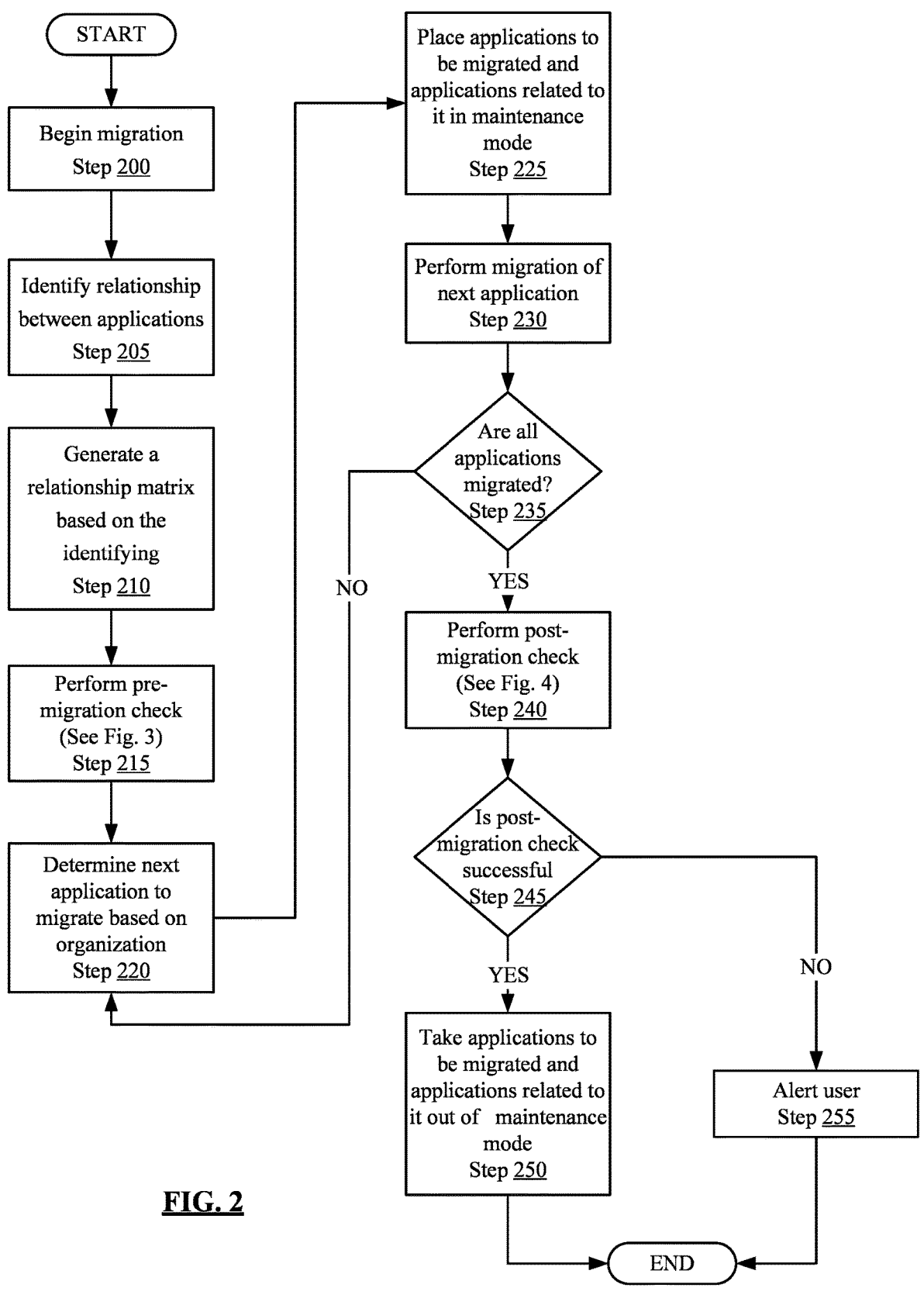
FIG. 2 shows a flowchart of a method for migrating applications in accordance with one or more embodiments of the invention.

FIG. 2 shows a flowchart describing a method for migrating one or more applications from a first device to a second device in accordance with one or more embodiments disclosed herein. The method may be performed by, for example, the migrator (e.g., 102, FIG. 1A) and/or any other part of either the source device (e.g., 100, FIG. 1A) or target device (e.g., 104, FIG. 1A). Other components of the system illustrated in FIGS. 1A and 1B may perform all, or a portion of the method of FIG. 2 without departing from the invention.

While FIG. 2 is illustrated as a series of steps, any of the steps may be omitted, performed in a different order, additional steps may be included, and/or any or all the steps may be performed in a parallel and/or partially overlapping manner without departing from the invention.

In Step 200, a request is received to migrate any amount of a source device's applications and/or information to a target device or devices. In one or more embodiments, the migration request is received by a migrator (e.g., 102, FIG. 1A).

In Step 205, the application relationship mapper (e.g., 122, FIG. 1B) or other component identifies the relationship between the application being migrated as well as those that depend on it, or the application depends on. The application relationship mapper (e.g., 122, FIG. 1B) may determine any additional components and/or systems that are dependent on the application or that the application is dependent on.

In one or more embodiments of the invention, the application relationship mapper (e.g., 122, FIG. 1B) may also determine the relationship each application has with each other application that is being migrated such as determining if two migrating applications have a HAS-A or IS-A relationship. As discussed above, this is done by having the application relationship mapper (e.g., 122, FIG. 1B) analyze inter-process communications. The inter-process communication may include any one of shared memory segments, pipes, message queues, semaphore arrays and sockets. Other inter-process communications may be monitored as well. From this analysis and/or other processes, the specific port(s) that an application is running on are identified. The application relationship mapper (e.g., 122, FIG. 1B) may also identify shared pipes. In one or more embodiments of the invention, the relationship mapper may also utilize system logs to determine which applications communicate with each other as well as when they are most active or least active.

Based on the inter-process communications, ports, and shared pipes, as well as system logs, the application relationship mapper (e.g., 122, FIG. 1B) may identify applications that are related to each other. Using the information gathered on the various communications, ports and pipes, the application relationship mapper may determine their relationship and identify if the relationship is an IS-A or HAS-A type relationship, as well as determined which applications are affected or are dependent on an application or system that is being migrated.

In step 210, the migrator (e.g., 102, FIG. 1B) and/or relationship mapper (e.g., 122, FIG. 1B) uses this identification of the relationships between the at least two applications to produce a matrix for each application showing its relationship to other applications and/or other components of the system. The matrix may take the form of a table, as shown in the exemplary table below:

TABLE 1

| | Relationship Matrix | |
|---|---|---|
| Application | Relationship | Applications |
| DA1 | HAS-A | DA2, DA3, DA4 |
| DA2 | HAS-A | DA1 |
| DA3 | HAS-A | DA1 |
| DA4 | HAS-A; IS-A | DA1, DA5; DA1, DA6 |
| DA5 | HAS-A | DA4 |
| DA6 | Independent node | |
| DA7 | HAS-A; IS-A | DA8; DA4 |
| DA8 | HAS-A; IS-A | DA7; DA4 |
| DA9 | IS-A | DA5 |
| DA10 | IS-A | DA5 |
| DA11 | IS-A | DA9 |
| DA12 | IS-A | DA7; DA4 |
| DA13 | IS-A | DA6 |
| DA14 | HAS-A; IS-A | DA15; DA13 |
| DA15 | HAS-A | DA14 |

In Table 1, the relationships between fifteen different applications (DA1-DA15) are shown. The target application is listed in the first column. The type of relationship the target application has with other applications is listed in the second column (HAS-A: where two applications are working together, IS-A: where the child application (dependent application) is dependent on the parent application, and Independent: the application is independent of the other applications). The applications that the target application has the relationship listed in the second column with is listed in the third column. More than one application may have the same type of relationship with the first application. The matrix produced in Step 204 may take other forms such as a database and in one or more embodiments of the invention, it may also be represented in the form of a relationship tree.

Next, in Step 215, the checker (e.g., 128, FIG. 1B) or other appropriate component of the system performs a pre-migration check of the migrating application(s) and those applications that are related to the migrating application. As described above, in one or more embodiments, the checker (e.g., 128, FIG. 1B) sends messages between each of the migrating applications and those applications/components that are related to it to determine pre-migration response times. The method of performing the pre-migration check is described in more detail below with regards to the method shown in FIG. 3. Other methods for performing the pre-migration check may be used, and the invention is not limited to the method described in FIG. 3.

The method then proceeds to Step 220, where the next (or first) application to be migrated is determined using the relationship matrix generated in Step 210 as well as the predetermined criteria for prioritizing applications being migrated (such as parent application prior to their dependents).

The method then proceeds to Step 225, where the maintenance planner (e.g., 126, FIG. 1B) places the application to be migrated, that was determined in Step 220, as well as those applications that are dependent on the application being migrated into a maintenance mode. By determining and placing even those applications that are not being migrated and are indirectly dependent on the application being migrated in the maintenance mode, the method minimizes unexpected failures to applications due to the migration.

In accordance with one or more embodiments of the invention, the maintenance planner may estimate how long the migration and subsequent restoration of the applications will take. Based on this estimate, the maintenance planner may notify users and/or administrators of the estimate amount of time that the applications will not be available, so that the user and/or administrator may make appropriate decisions on when to resume using the application as well as potentially altering the timing for the migration to a more convenient period of time.

Once the application is put in a maintenance mode in Step 225, the application determined in Step 220 is migrated from the source device (e.g., 100, FIG. 1A) to the target device (e.g., 104, FIG. 1A) by the migrator (e.g., 102, FIG. 1A) or other appropriate components of the system.

The method then proceeds to Step 235, where the method determines if all of the applications to be migrated have been migrated. If they have, the method proceeds to Step 240, otherwise, the method returns to Step 220, and the next application to be migrated is determined and migrated.

Next in step 240, the checker (e.g., 128, FIG. 1B) or other appropriate component of the system, performs a post-migration check of the migrating application(s) and those applications that are related to the migrating application. As described above, in one or more embodiments, the checker (e.g., 128, FIG. 1B) sends messages between each of the migrating applications and those applications/components that are related to it to determine pre-migration response times. The method of performing the post-migration check is described in more detail below with regards to the method shown in FIG. 4. Other methods for performing the pre-migration check may be used, and the invention is not limited to the method described in FIG. 4.

Once the checker or other appropriate component, performs the post-migration check, the method proceeds to Step 245, where it is determined if the post-migration check was successful. If the post-migration check is successful (meaning communication has been restored between the migrated application(s) and all related application(s) and component (s) at least within a predetermined threshold of a performance level), then the method proceeds to Step 250, where the maintenance planner or other related component takes the application(s) and those applications that are dependent on it that were placed in maintenance mode in Step 225 out of the maintenance mode, and the method ends.

If the post-migration check performed in Step 240 is found in Step 245 to not have been successful, the method alerts a user, administrator, or other concerned party. This alert, in one or more embodiments of the invention, may include sending data such as the results of the messages sent in Step 240 as well as any other useful information and/or telemetry. The user, administrator, or other concerned party may perform appropriate actions to ameliorate the failure so that the application that was migrated and those that are dependent on it may be restored. In one or more other embodiments of the invention, no action is taken, other than to alert the user, administrator, or other concerned party that the migration has failed.

The method may end after either Steps 250 or 255.

Figure 3:
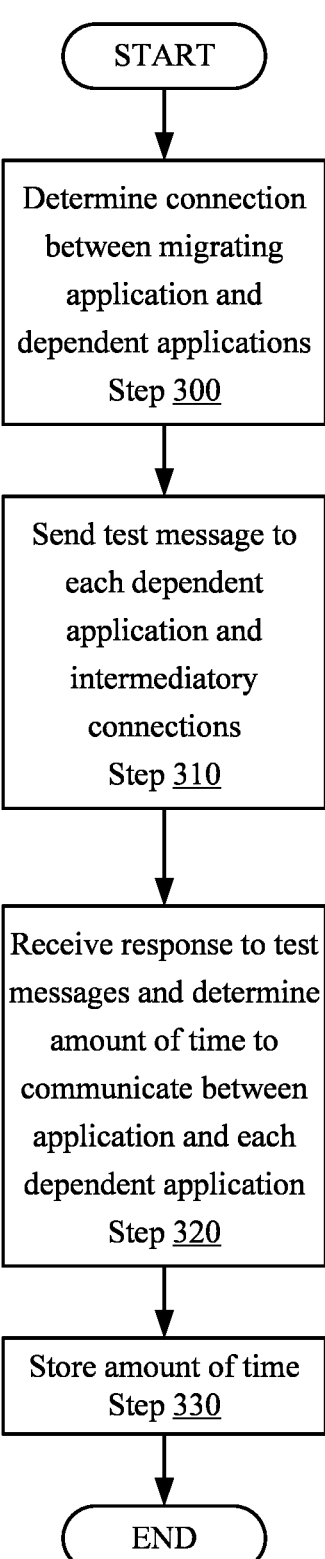
FIG. 3 shows a flowchart of a method for performing a pre-migration check in accordance with one or more embodiments of the invention.

FIG. 3 shows a flowchart describing a method for performing dynamic strategizing in accordance with one or more embodiments disclosed herein. This method may be performed on its own or as part of Step 215 of the method of FIG. 2. The method may be performed by, for example, the checker (e.g., 128, FIG. 1B) and/or any other part of either the source device (e.g., 100, FIG. 1) or target device (e.g., 104, FIG. 1). Other components of the system illustrated in FIGS. 1A and 1B may perform all, or a portion of the method of FIG. 3 without departing from the invention.

While FIG. 3 is illustrated as a series of steps, any of the steps may be omitted, performed in a different order, additional steps may be included, and/or any or all the steps may be performed in a parallel and/or partially overlapping manner without departing from the invention.

In Step 300, for each application that is to be migrated, the method determines which applications and other components of the system have a relationship with the application being migrated. These may be applications that the application is dependent on or could be applications that are dependent on the application. Other components of the system, for example storage volumes, which in a non-limiting example could include data for a database that the application relies on, are also determined by the method. Other components including, but not limited to, remote edge and/or cloud environments may be included as related components when they are either dependent on the application being migrated or the application being migrated is dependent on them.

Once all the related applications and components are determined in Step 300, the method proceeds to Step 310. In Step 310, the checker (e.g., 128, FIG. 1B) or other related components of the system, sends a test message to each of the migrating applications as well as the related applications, components, and intermediary connections. In one or more embodiments of the invention, this is done by sending a message to the applications being migrated, which then forwards a message to each related application and component. Alternatively, in one or more embodiments of the invention, messages may be sent directly from the checker (e.g., 128, FIG. 1B) to each application, component, and any intermediary connections and/or hops. The message, in one or more embodiments of the invention, may take the form of a ping. Other methods of sending messages to each application and/or component, as well as other forms of messages may be used without departing from the invention.

Once all of the applications and related components receive the one or more messages from the checker (e.g., 128, FIG. 1B), the applications and related components send a response message. The response is received in Step 320, and the time it takes to communicate with the migrated application as well as each application or component that is related to it may be determined. Other information such as the number of network hops or other telemetry may be also received, which may be used for any future maintenance or planning purposes.

Once the amount of time is determined in Step 320, the method proceeds to Step 330 where the checker (e.g., 128, FIG. 1B) or other related component stores the amount of time it takes to communicate with the applications being migrated and those applications and components related to it. This time data, along with any other data determined in step 320, is stored for future use after the migration. This data may be stored in the virtual storage devices (e.g., 144, FIG. 1B) of the source device (e.g., 100, FIG. 1A), the target device (e.g., 104, FIG. 1A) or other storage location that is accessible both pre-migration and post-migration.

Once Step 330 is complete, the method may end.

Figure 4:
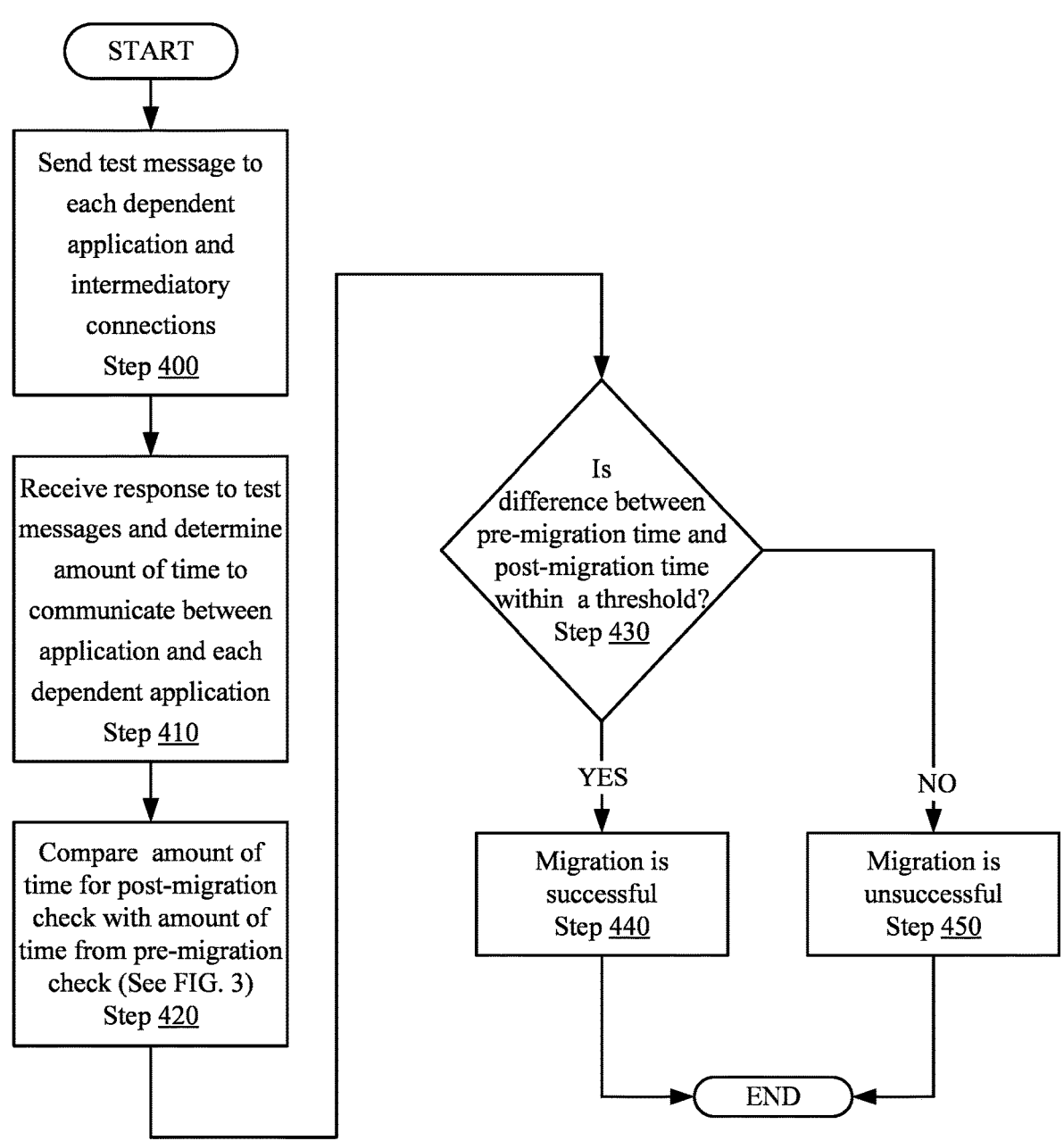
FIG. 4 shows a flowchart of a method for performing a post-migration check in accordance with one or more embodiments of the invention.

FIG. 4 shows a flowchart of a method for performing a post-migration check in accordance with one or more embodiments of the invention. This method may be performed on its own or as part of Step 240 of the method of FIG. 2. The method may be performed by, for example, the checker (e.g., 128, FIG. 1B) and/or any other part of either the source device (e.g., 100, FIG. 1) or target device (e.g., 104, FIG. 1). Other components of the system illustrated in FIGS. 1A and 1B may perform all, or a portion of the method of FIG. 4 without departing from the invention.

While FIG. 4 is illustrated as a series of steps, any of the steps may be omitted, performed in a different order, additional steps may be included, and/or any or all the steps may be performed in a parallel and/or partially overlapping manner without departing from the invention.

In Step 400, the checker (e.g., 128, FIG. 1B) or other related components of the system, sends a test message to each of the migrating applications as well as the related applications, components, and intermediary connections. In one or more embodiments of the invention, this is done by sending a message to the applications being migrated, which then forwards a message to each related application and component. Alternatively, in one or more embodiments of the invention, messages may be sent directly from the checker (e.g., 128, FIG. 1B) to each application, component, and any intermediary connections and/or hops. As discussed above with regards to the method of FIG. 3, the message in one or more embodiments of the invention may take the form of a ping. Other methods of sending messages to each application and/or component, as well as other forms of messages may be used without departing from the invention.

Once all the applications and related components receive the one or more messages from the checker (e.g., 128, FIG. 1B), they send a response message. The response is received in Step 410 and the time it takes to communicate with the migrated application as well as each application or component that is related to it may be determined. Other information such as the number of network hops or other telemetry may be also received, which may be used for any future maintenance purposes. If no response at all was received in Step 410, the method may skip to Step 430, where the answer would be NO. Otherwise, the method proceeds to step 420.

In step 420, the checker (e.g., 128, FIG. 1B) or other related component retrieves the time data stored in the pre-migration check as described in more detail above with regards to the method of FIG. 3, specifically Step 330. The time determined in Step 410 is compared with that obtained in the pre-migration check to determine a difference. For example, in a non-limiting example, if the migrated application during the pre-migration check took 20 ms to communicate with a database but during the post-migration check took 25 ms, the difference would be 5 ms, equating to a 25% increase. The difference may be positive or negative, and a different difference may be given for each application and component. In another non-limiting example, suppose an intermediary application that the migrated application is dependent on, during the pre-migration check takes 5 ms to respond but during the post-migration check takes 6 ms, then the difference for this component is 1 ms equating to a 20% increase.

Once the difference is determined, the method proceeds to Step 430, where the difference is compared with a threshold. If the difference in communication time for the migrated applications and all of the related applications and components is less than the threshold, the method proceeds to Step 440 where the migration is considered successful. Otherwise, if the difference for any of the migrated applications, related applications, and/or related components is greater than the threshold, or no response was received at all in Step 410, the method proceeds to Step 450 where the migration is indicated/considered to have been unsuccessful and the method ends.

In one or more embodiments of the invention, the threshold may be a predetermined difference in time or a percentage change in the amount of time. This threshold may be predetermined by a user, administrator, manufacturer, and/or other concerned party. The predetermined threshold may be a universal threshold for all migrations or could be set for the specific migration currently being performed (for example, it might be desirable to have a migration to a cloud environment to have a much higher threshold then a migration to a different host in the same information handling system).

Using the previous example, where the difference is 5 ms. If the threshold is 30% increase, then this migration would be considered to have passed as the increase is only 25%. However, if the threshold is 21%, because the response time for the database increased by 25%, the migration would be considered unsuccessful. Other percentages or difference may be used without departing from the invention, and the above values are only examples and not necessarily representative of real values.

Once either Step 440 or 450 is complete, the method may end.

Example

Figure 5:
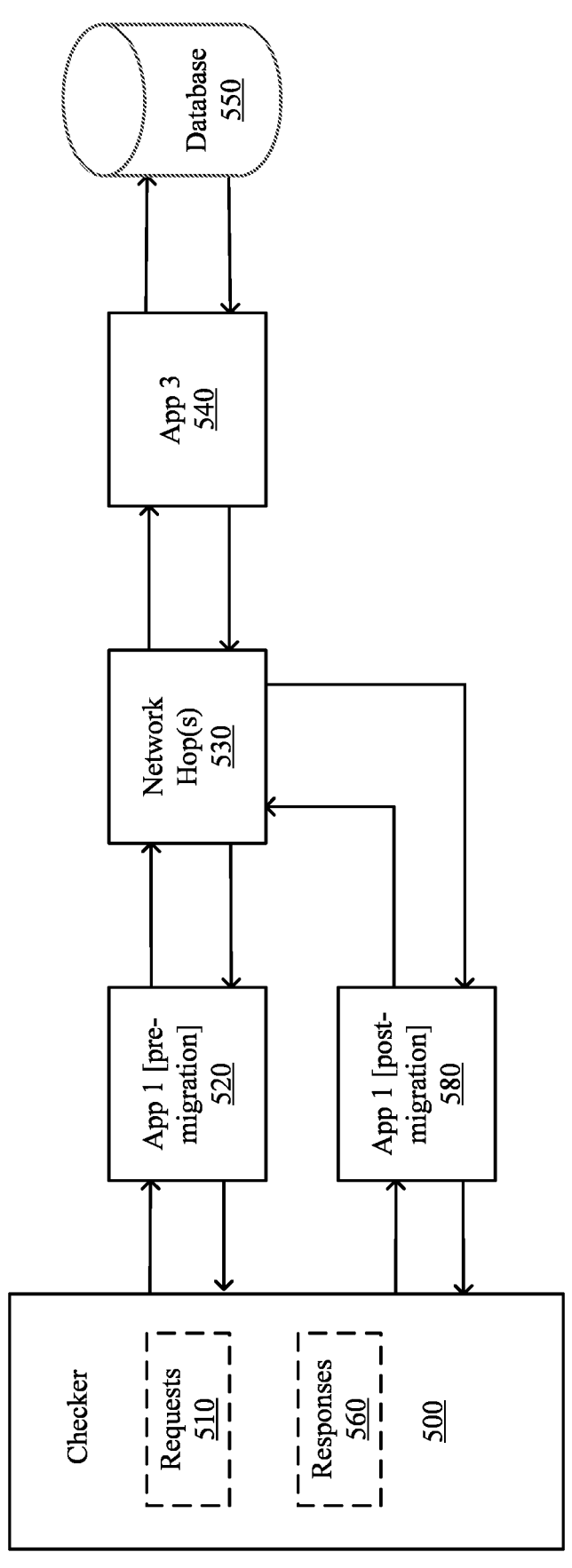
FIG. 5 shows an example of a system performing both a pre-migration and post-migration check in accordance with one or more embodiments of the invention.

FIG. 5 shows an example of a system that includes a checker, application being migrated and related applications, intermediary devices, and storage devices in order to better describe how the checker determines if a migration has been successful in accordance with the methods described above and shown in FIGS. 2-4. While the example is shown with a simple number of relationships and organization for easier understanding, more or less applications, components and intermediary components/applications may be considered and related to an application being migrated.

The example includes two applications (520, 580, and 540), one of which is being migrated (520 before and 580 after). The example further includes network hops (530) between the first application (e.g., 520 or 580) and the second (e.g., 540) and a database (e.g., 550). A checker (500) is also included and may have similar functionality to the checker described with regards to FIG. 1B (e.g., 128, FIG. 1B). More or less applications may be mapped in this manner and the number of applications is only dependent on the number of applications that the migration described in the method of FIGS. 2-4 is specified to be performed as specified by either a user, administrator, or other components of the migrator (e.g., 102, FIG. 1B).

In the example shown in FIG. 5, assume that application 1 (e.g., 520) in being migrated to a second location (e.g., 580). During the pre-migration check, the checker (500) sends a request (510) to the application (e.g., 520) which then forwards a copy of the request to and through various network hops (e.g., 530), application 2 (e.g., 540) and the database (e.g., 550). Alternatively, the checker may send individual requests (510) to each component directly (e.g., a message such as a ping to each of applications 520 and 540 as well as network hop(s) 530 and database 550). The request (510) takes the form of a ping or other related message.

Once each application and/or component (e.g., 520, 530, 540, 550) receives the request (510), each component sends a response (560) back to the checker (500). The checker (500) then determines the time that it took to communicate with and/or between each of the components (e.g., 520, 530, 540, 550). In a non-limiting example this might be 3 ms, 3.5 ms, 4 ms, and 6 ms. Other response times may be used without departing from the invention, and are the result of an individual systems configuration, network capabilities, distance between components, and other factors. These times are stored, and the migration is performed moving application 1 (520) to a new location (580).

Once the migration is complete, a post-migration check is performed. As was done with the pre-migration check, the checker (500) sends a request (510) to the application (e.g., 580) which then forwards a copy of the request to and through various network hops (e.g., 530), application 2 (e.g., 540) and the database (e.g., 550). Alternatively, the checker may send individual request (510) directly to each component (e.g., a message such as a ping to each of applications 580 and 540 as well as network hop(s) 530 and database 550).

Once each application and/or component (e.g., 580, 530, 540, 550) receives the request (510), each component sends a response (560) back to the checker (500). The checker (500) then determines the time that it took to communicate with and/or between each of the components (e.g., 580, 530, 540, 550) post-migration. In a non-limiting example this might be 5 ms, 5.5 ms, 5.6 ms, and 6 ms. Or in another example 3.5 ms, 10 ms, 11 ms, and 12 ms. Other response times, including no response, may occur without departing from the invention, and are the result of an individual systems configuration, network capabilities, distance between components, and other factors.

These new times are compared to the previous times that were stored prior to the migrating of application 1 (520) to its new location (580). A difference is calculated for each application and component. In the first example the difference would be: 2 ms, 2 ms, 1.6 ms and 0ms, while in the second example the difference would be: 0.5 ms, 6.5 ms, 6 ms, and 6 ms. These times are then compared to a threshold difference set by a user, administrator, manufacturer, or other concerned entity.

If the threshold is set at no more than 2 ms, the first migration would pass and the second migration would fail. However, in a second example, if the threshold is less then 2 ms, both exemplary migrations would be considered to have failed. In yet a third example, if the threshold is greater than 6 ms, both migrations would be considered to have passed.

In accordance with one or more embodiments of the invention, the threshold may be any amount of time and may be different for different applications and components. Further, the threshold may be set as a percent change rather than a set amount of time. Other methods of migrating, checking, and methods of determining if the migrations were successful, may be considered in accordance with one or more embodiments of the invention based on criteria specified by a user or administrator as well as other components of the migrator (e.g., 102 of FIG. 1B) in addition to the methods described above and with regards to the methods of FIGS. 2-4. FIG. 5 is intended as an example only.

End Example

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many diverse types of computing devices exist, and the aforementioned input and output device(s) may take other forms.

In general, embodiments described above relate to methods, systems, and non-transitory computer readable mediums storing instructions for creating and executing migration workflows to replicate or migrate data from one device or set of devices to another device or set of devices (e.g., from one computing environment to another). In one or more embodiments, migrations involve obtaining relationship information with regards to the applications that will be migrated from one device to another device or set of devices. This relationship information is used to determine which applications and/or other system resources are affected by the migration, including those applications/system resources that are not being migrated.

The embodiments described above further are related to methods, systems, and non-transitory computer readable mediums storing instructions for performing checks both before a migration and after the migration is completed to determine if the migrated application and those applications related to it are sufficiently connected and are functioning. A checker messages each application or device associated with one or more applications that have been migrated, in order to determine that all related applications and/or components such as storage devices are communicating in a sufficient manner to provide a desired level of performance to a user of the one or more applications. If the desired level of performance (compared to pre-migration) is not achieved, then a user or administrator may be alerted to perform necessary interventions to restore the one or more applications or related components of any computing devices hosting the one or more applications, so that all migrated applications and related applications may be brought back online and provide a sufficient user experience.

The problems discussed above should be understood as being examples of problems solved by embodiments of the invention, and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments may be devised which do not depart from the scope of embodiments as disclosed herein. Accordingly, the scope of embodiments described herein should be limited only by the attached claims.

What is claimed is:

1. A method for performing a migration, the method comprising:
identifying an application to be migrated;
identifying a second application that is related to the application to be migrated by analyzing inter-process communications between the application and the second application, wherein the inter-process communications comprise:
shared memory segments;
pipes;
system logs;
message queues;
semaphore arrays; and
sockets;
generating a relationship matrix specifying the application, the second application, and a relationship between the application and the second application;
performing a pre-migration check of the application to be migrated and the second application that is related to the application to be migrated;
selecting, after the pre-migration check and based on the relationship matrix, the application;
performing, after the selecting, the migration of the application;
performing, after the migration, a post-migration check of the application and the second application; and
alerting, after performing the post-migration check, a user when the post-migration check fails.

2. The method of claim 1, wherein the application to be migrated is one of a plurality of applications that are to be migrated.

3. The method of claim 1, wherein prior to performing the migration of the application to be migrated, both the application to be migrated and the second application that is related to the application to be migrated are placed in a maintenance mode.

4. The method of claim 3, wherein when the post-migration check is successful, removing both the application to be migrated and the second application that is related to the application to be migrated, from the maintenance mode.

5. The method of claim 1, wherein both the pre-migration check and the post-migration check comprise determining an amount of time it takes for a message to be sent from the application to be migrated to one or more of the second application that is related to the application to be migrated.

6. The method of claim 5, wherein the post-migration check fails when the amount of time it takes for the message to be sent during the post-migration check is greater than a threshold difference from the time it took for the message to be sent during the pre-migration check.

7. The method of claim 6, wherein the threshold is a predetermined percentage.

8. A non-transitory computer readable medium comprising computer readable program code, which when executed by a computer processor enables the computer processor to perform a method for performing a migration, the method comprising:
identifying an application to be migrated;
identifying at least one application that is related to the application to be migrated by analyzing inter-process communications between the application and the at least one application, wherein the relationship is one of HAS-A and IS-A, and wherein the inter-process communications comprise:
shared memory segments;
pipes;
system logs;
message queues;
semaphore arrays; and
sockets;
performing a pre-migration check of the application to be migrated and the at least one application that is related to the application to be migrated;
performing, after the pre-migration check, the migration of the application to be migrated;
performing, after the migration, a post-migration check of the application to be migrated and the at least one application that is related to the application to be migrated; and
alerting a user when the post-migration check fails.

9. The non-transitory computer readable medium of claim 8, wherein the application to be migrated is one of a plurality of applications that are to be migrated.

10. The non-transitory computer readable medium of claim 8, wherein prior to performing the migration of the application to be migrated, both the application to be migrated and the at least one application that is related to the application to be migrated are placed in a maintenance mode.

11. The non-transitory computer readable medium of claim 10, wherein when the post-migration check is successful, removing both the application to be migrated and the at least one application that is related to the application to be migrated, from the maintenance mode.

12. The non-transitory computer readable medium of claim 8, wherein both the pre-migration check and the postmigration check comprise determining an amount of time it takes for a message to be sent from the application to be migrated to one or more of the at least one application that is related to the application to be migrated.

13. The non-transitory computer readable medium of claim 12, wherein the post-migration check fails when the amount of time it takes for the message to be sent during the post-migration check is greater than a threshold difference from the time it took for the message to be sent during the pre-migration check.

14. The non-transitory computer readable medium of claim 13, wherein the threshold is a predetermined percentage.

15. A system comprising:
a migrator which comprises:
   at least one processor;
   a storage device; and
   at least one memory that includes instructions, which when executed by the processor, perform a method for performing a migration, the method comprising:
      identifying a second application that is related to the application to be migrated by analyzing inter-process communications between the application and the second application, wherein the inter-process communications comprise:
      shared memory segments;
      pipes;
      system logs;
      message queues;
      semaphore arrays; and sockets;
      generating a relationship matrix specifying the application, the second application, and a relationship between the application and the second application;
      performing a pre-migration check of the application to be migrated and the second application that is related to the application to be migrated;
      selecting, after the pre-migration check and based on the relationship matrix, the application;
      performing, after the selecting, the migration of the application;
      performing, after the migration, a post-migration check of the application and the second application; and
      alerting, after performing the post-migration check, a user when the post-migration check fails.

16. The system of claim 15, wherein the application to be migrated is one of a plurality of applications that are to be migrated.

17. The system of claim 15, wherein prior to performing the migration of the application to be migrated, both the application to be migrated and the at least one application that is related to the application to be migrated are placed in a maintenance mode.

\* \* \* \* \*